US009369963B2

(12) United States Patent
Kawakita et al.

(10) Patent No.: US 9,369,963 B2
(45) Date of Patent: Jun. 14, 2016

(54) WIRELESS TERMINAL DEVICE AND COMMUNICATION CONTROL METHOD

(71) Applicant: KYOCERA Corporation, Kyoto (JP)

(72) Inventors: Masaya Kawakita, Kyoto (JP); Daisuke Mori, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 57 days.

(21) Appl. No.: 13/724,377

(22) Filed: Dec. 21, 2012

(65) Prior Publication Data

US 2013/0165179 A1 Jun. 27, 2013

(30) Foreign Application Priority Data

Dec. 22, 2011 (JP) ................................ 2011-282402

(51) Int. Cl.
*H04M 1/00* (2006.01)
*H04W 52/02* (2009.01)

(52) U.S. Cl.
CPC ................................ *H04W 52/0251* (2013.01)

(58) Field of Classification Search
CPC ...... H04W 88/04; H04W 40/22; H04W 76/02
USPC ................ 455/555, 554.1, 434, 552.1, 553.1, 455/426.1
See application file for complete search history.

(56) References Cited

U.S. PATENT DOCUMENTS 8,152,308 B2 * 4/2012 Ahn ...................... G06F 1/3203 345/173
2004/0003030 A1 * 1/2004 Abe .................... H04L 12/5855 709/203
2009/0047946 A1 * 2/2009 Sato ...................... H04W 88/06 455/426.1
2011/0170461 A1 * 7/2011 Iida ........................ H04B 7/155 370/280
2012/0054353 A1 * 3/2012 Jung ..................... H04W 88/04 709/227

FOREIGN PATENT DOCUMENTS

JP 2009-49875 A 3/2009

* cited by examiner

*Primary Examiner* — Patrick Edouard
*Assistant Examiner* — Said Elnoubi
(74) *Attorney, Agent, or Firm* — Hauptman Ham, LLP

(57) ABSTRACT

A smartphone includes: a first communication processing unit that performs wireless communication by a WiMAX network; a second communication processing unit that performs communication with an external device; a touch-screen display; and a controller. In a state of searching for WiMAX, in a case in which a power supply of the touch-screen display is turned off and communication with the external device by the second communication processing unit is disconnected, the controller causes the first communication processing unit to stop searching for WiMAX.

9 Claims, 8 Drawing Sheets

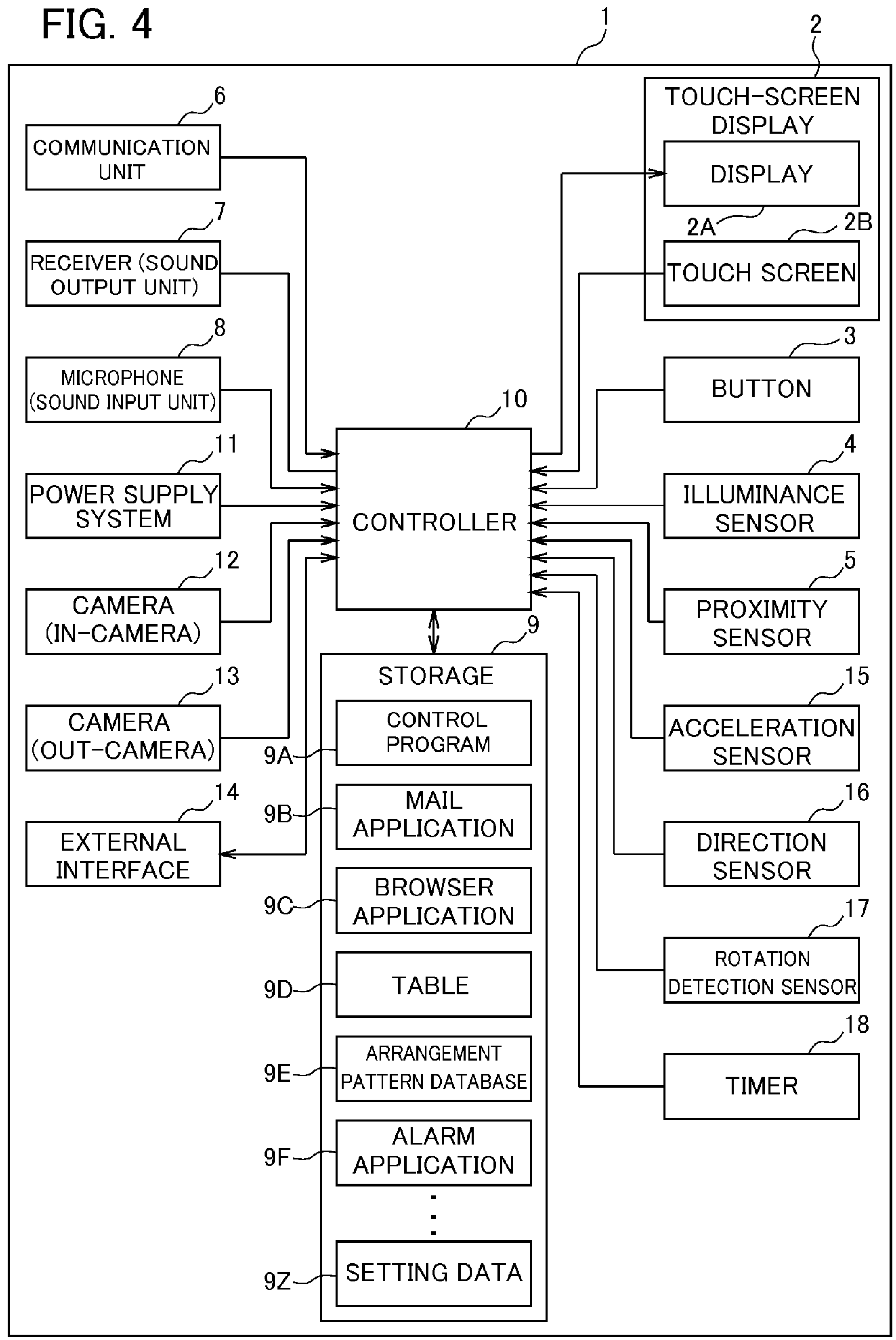

FIG. 4
1
2
TOUCH-SCREEN DISPLAY
DISPLAY
2A
2B
TOUCH SCREEN
6
COMMUNICATION UNIT
7
RECEIVER (SOUND OUTPUT UNIT)
8
MICROPHONE (SOUND INPUT UNIT)
11
POWER SUPPLY SYSTEM
12
CAMERA (IN-CAMERA)
13
CAMERA (OUT-CAMERA)
14
EXTERNAL INTERFACE
10
CONTROLLER
9
STORAGE
9A
CONTROL PROGRAM
9B
MAIL APPLICATION
9C
BROWSER APPLICATION
9D
TABLE
9E
ARRANGEMENT PATTERN DATABASE
9F
ALARM APPLICATION
9Z
SETTING DATA
3
BUTTON
4
ILLUMINANCE SENSOR
5
PROXIMITY SENSOR
15
ACCELERATION SENSOR
16
DIRECTION SENSOR
17
ROTATION DETECTION SENSOR
18
TIMER

WIRELESS TERMINAL DEVICE AND COMMUNICATION CONTROL METHOD

CROSS-REFERENCE TO RELATED APPLICATIONS

This application is based on and claims the benefit of priority from Japanese Patent Application No. 2011-282402, filed on 22 Dec. 2011, the content of which is incorporated herein by reference.

BACKGROUND OF THE INVENTION

1. Field of the Invention

The present invention relates to a wireless terminal device and a communication control method, in which transition to a power-saving state is possible.

2. Related Art

Wireless terminal devices that include a touch screen display are known heretofore, such as a smartphone and a tablet device. In such a situation, a technique for reducing power consumption of a wireless terminal device has been proposed (for example, see Japanese Unexamined Patent Application, Publication No. 2009-49875).

SUMMARY OF THE INVENTION

An object of the present invention is to provide a wireless terminal device and a communication control method, in which reducing power consumption is possible while suppressing deterioration in convenience.

A wireless terminal device according to the present invention includes: a first communication unit that performs wireless communication by a network of a first wireless communication system; a second communication unit that performs communication with an external device; a display unit; and a control unit. In a state of searching for the first wireless communication system, in a case in which a power supply of the display unit is turned off, and communication with the external device by the second communication unit is disconnected, the control unit causes the first communication unit to stop searching for the first wireless communication system.

In a state of searching for the first wireless communication system, in a case in which the power supply of the display unit is turned off and communication with the external device by the second communication unit is not disconnected, it is preferable for the control unit to cause the first communication unit to continue searching for the first wireless communication system.

After the control unit causes the first communication unit to stop searching for the first wireless communication system, when the power supply of the display unit is turned on, it is preferable for the control unit to cause the first communication unit to start searching for the first wireless communication system.

After the control unit causes the first communication unit to stop searching for the first wireless communication system, when communication with the external device by the second communication unit is connected, it is preferable for the control unit to cause the first communication unit to start searching for the first wireless communication system.

A communication control method according to the present invention is a communication control method for a wireless terminal device including: a first communication unit that performs wireless communication by a network of a first wireless communication system; a second communication unit that performs communication with an external device; and a display unit. In a state of searching for the first wireless communication system, in a case in which a power supply of the display unit is turned off and communication with the external device by the second communication unit is disconnected, the method causes the first communication unit to stop searching for the first wireless communication system.

In a state of searching for the first wireless communication system, in a case in which the power supply of the display unit is turned off and communication with the external device by the second communication unit is not disconnected, it is preferable for the communication control method to cause the first communication unit to continue searching for the first wireless communication system.

According to the present invention, the wireless terminal device can reduce power consumption while suppressing deterioration in convenience.

BRIEF DESCRIPTION OF THE DRAWINGS

FIG. 4 is a block diagram showing an arrangement of the smartphone according to the embodiment;

DETAILED DESCRIPTION OF THE INVENTION

An embodiment for carrying out the present invention is described in detail with reference to the drawings. Hereinafter, a smartphone will be described as an example of a wireless terminal device.

Figure 1:
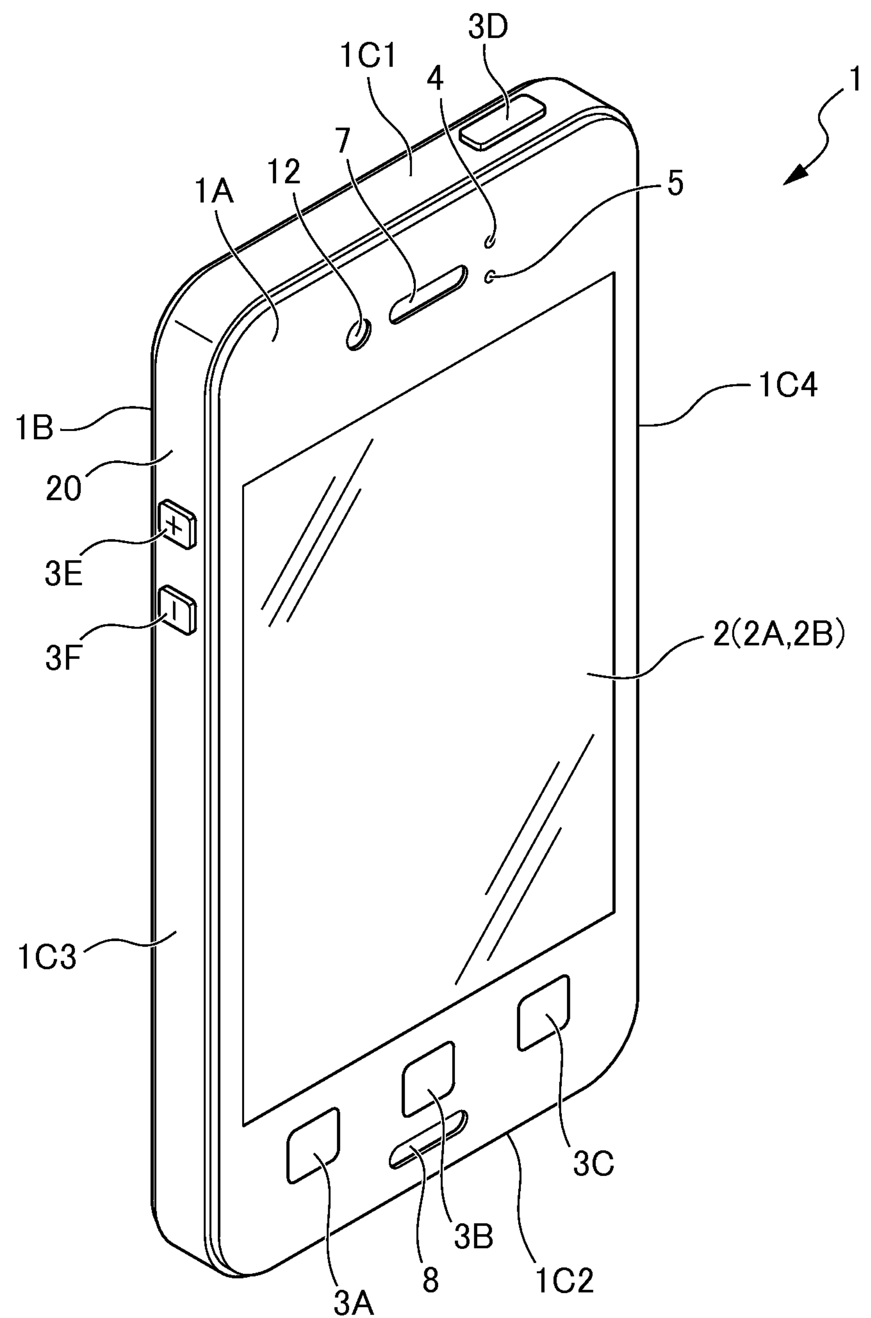
FIG. 1 is a perspective view showing an external appearance of a smartphone according to an embodiment.
Figure 2:
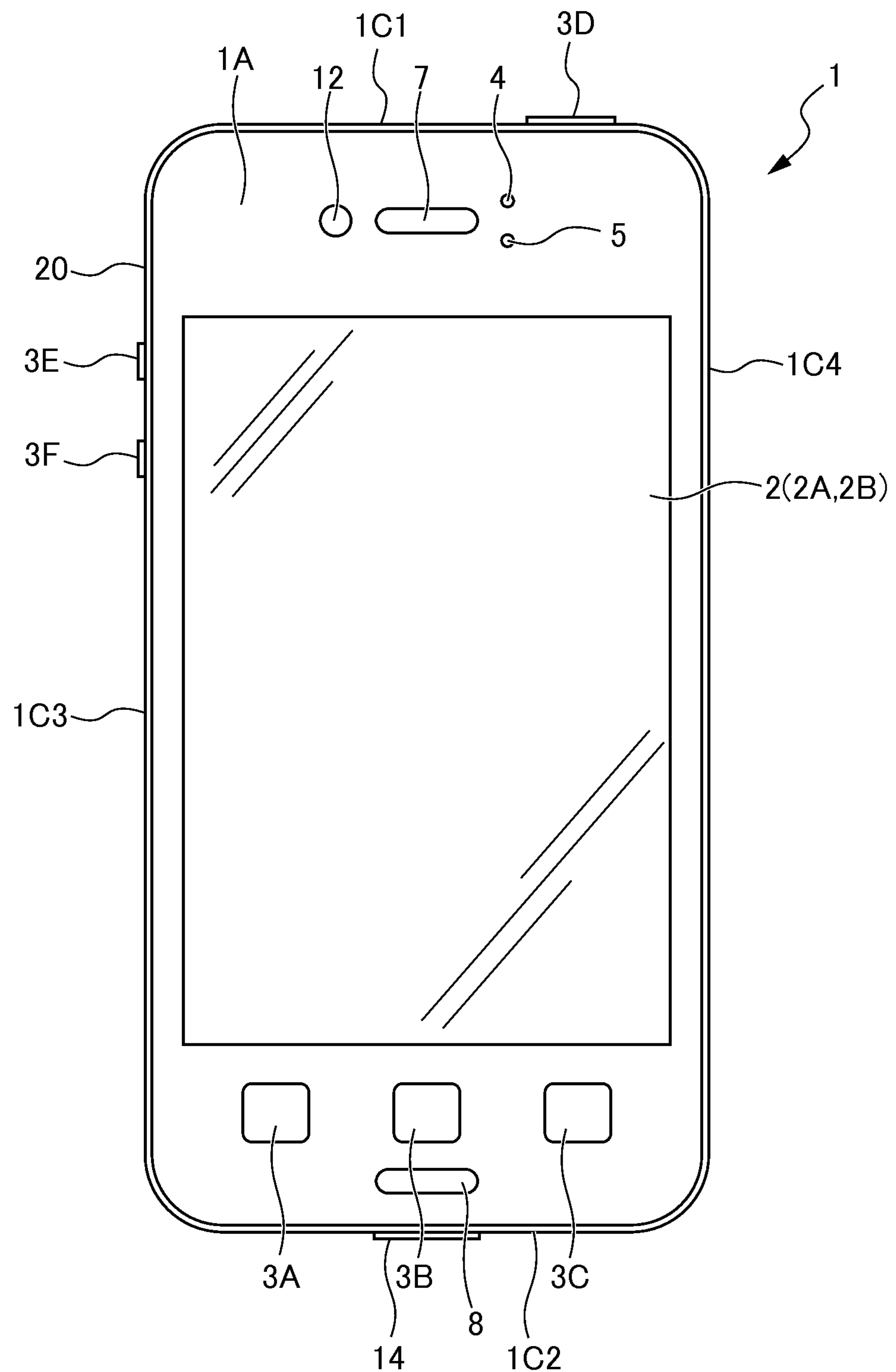
FIG. 2 is a front view showing the external appearance of the smartphone according to the embodiment.
Figure 3:
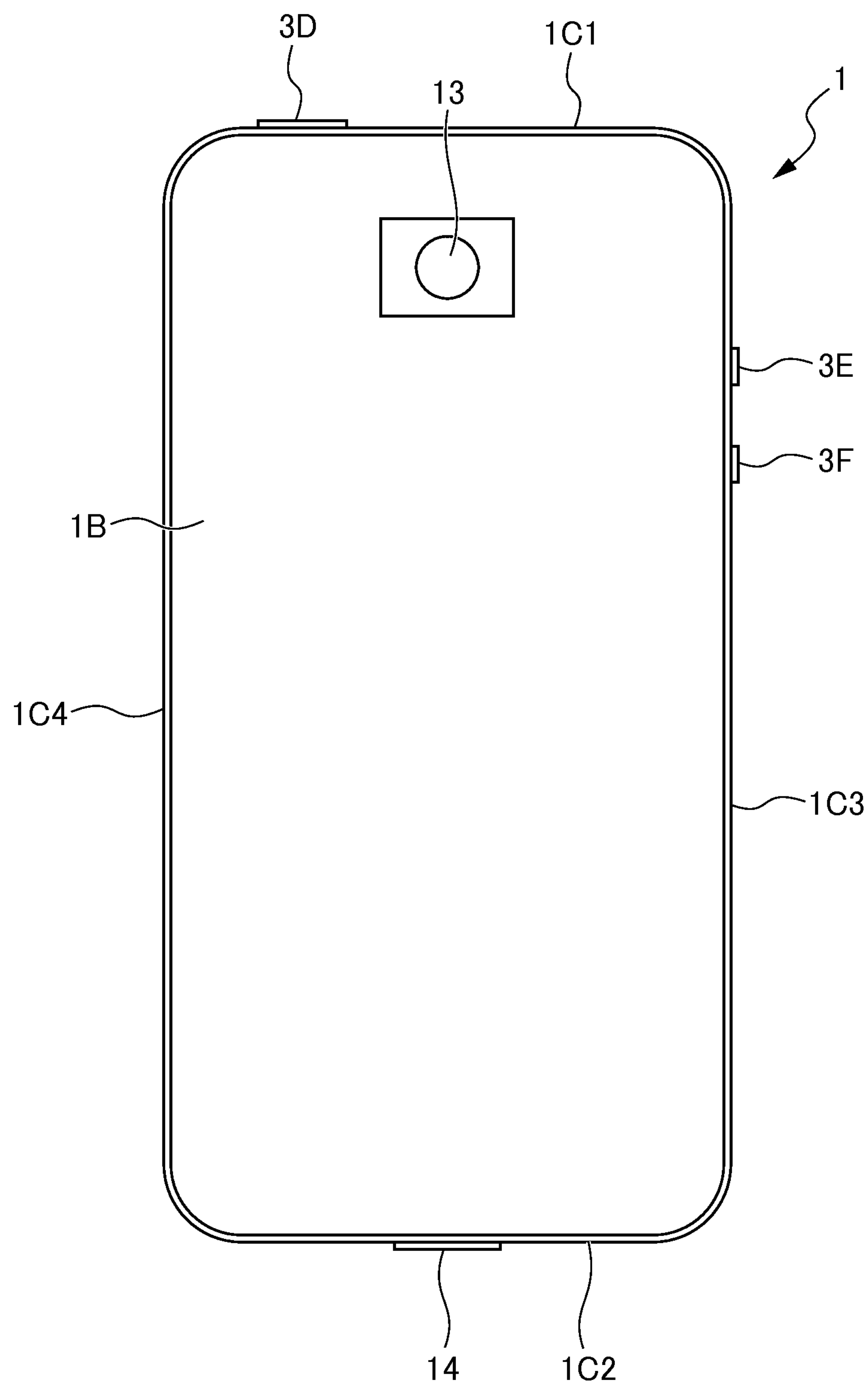
FIG. 3 is rear view showing the external appearance of the smartphone according to the embodiment.

Descriptions are provided for an external appearance of a smartphone 1 according to the embodiment with reference to FIGS. 1 to 3. As shown in FIGS. 1 to 3, the smartphone 1 has a housing 20. The housing 20 has a front face 1A, a back face 1B, and side faces 1C1 to 1C4. The front face 1A is a front face of the housing 20. The back face 1B is a back face of the housing 20. The side faces 1C1 to 1C4 are side faces that connect the front face 1A and the back face 1B. In the following descriptions, the side faces 1C1 to 1C4 may be collectively referred to as a side face 1C without specifying which face.

On the front face 1A, the smartphone 1 has a touch-screen display 2, buttons 3A to 3C, an illuminance sensor 4, a proximity sensor 5, a receiver 7, a microphone 8, and a camera 12. The smartphone 1 has a camera 13 in the back face 1B. The smartphone 1 has buttons 3D to 3F and an external interface 14 in the side face 1C. In the following descriptions, the buttons 3A to 3F may be collectively referred to as a button 3 without specifying which button.

The touch-screen display 2 has a display 2A and a touch screen 2B. The display 2A includes a display device such as a liquid crystal display, an organic electro-luminescence panel, or an inorganic electro-luminescence panel. The display 2A displays characters, images, symbols, graphics or the like.

The touch screen 2B detects a touch by a finger, a stylus pen or the like to the touch-screen display 2. The touch screen 2B detects a position where a plurality of fingers, the stylus pen or the like touch the touch-screen display 2.

A detection method for the touch screen 2B may be any method such as a capacitive sensing method, a resistor film method, a surface acoustic wave method (or an ultrasonic sensing method), an infrared ray method, an electromagnetic induction method, and a load detection method. In the following, for the purpose of simplifying descriptions, the fingers, the stylus pen or the like, touching of which to the touch-screen display 2 is detected by the touch screen 2B, may be simply referred to as a "finger".

The smartphone 1 distinguishes types of gestures, based on a touch, a touch position(s), a touching period of time, or the number of times touching is done, as detected by the touch screen 2B. The gesture is an operation that is performed on the touch-screen display 2. Gestures that are distinguished by the smartphone 1 include a touch, a long touch, a release, a swipe, a tap, a double tap, a long tap, a drag, a flick, a pinch-in, a pinch-out, and the like.

The touch is a gesture of a finger that touches the touch-screen display 2 (for example, a surface thereof). The smartphone 1 distinguishes the gesture of a finger touching the touch-screen display 2 as a touch. The long touch is a gesture of a finger touching the touch-screen display 2 for more than a certain period of time. The smartphone 1 distinguishes the gesture of a finger touching the touch-screen display 2 for more than a certain period of time as a long touch.

The release is a gesture of a finger being released from the touch-screen display 2. The smartphone 1 distinguishes the gesture of a finger being released from the touch-screen display 2 as a release. The swipe is a gesture of a finger moving while touching the touch-screen display 2. The smartphone 1 distinguishes the gesture of a finger moving while touching the touch-screen display 2 as a swipe.

The tap is a consecutive gesture of touch and release. The smartphone 1 distinguishes the consecutive gesture of touch and release as a tap. The double tap is a gesture of repeating a consecutive gesture of touch and release two times. The smartphone 1 distinguishes the gesture of repeating a consecutive gesture of touch and release two times as a double tap.

The long tap is a consecutive gesture of a long touch and release. The smartphone 1 distinguishes the consecutive gesture of a long touch and release as a long tap. The drag is a gesture of swiping from a starting point where a movable object is displayed. The smartphone 1 distinguishes the gesture of swiping from a starting point where a movable object is displayed as a drag.

The flick is a consecutive gesture of touch and release of a finger moving at a high-speed in one direction. The smartphone 1 distinguishes the gesture of touch and release of a finger moving at a high-speed in one direction as a flick. The flick includes: an upward flick of a finger moving in an upward direction on the screen; a downward flick of a finger moving in a downward direction on the screen; a rightward flick of a finger moving in a rightward direction on the screen; a leftward flick of a finger moving in a leftward direction on the screen; and the like.

The pinch-in is a gesture of a plurality of fingers swiping in mutually approaching directions. The smartphone 1 distinguishes the gesture of a plurality of fingers swiping in mutually approaching directions as a pinch-in. The pinch-out is a gesture of a plurality of fingers swiping in mutually receding directions. The smartphone 1 distinguishes the gesture of a plurality of fingers swiping in mutually receding directions as a pinch-out.

The smartphone 1 is operated in accordance with these gestures that are distinguished via the touch screen 2B. Therefore, intuitive and easy-to-use operability is achieved for a user. An operation, which is performed by the smartphone 1 in accordance with a gesture thus distinguished, is different depending on the screen that is displayed on the touch-screen display 2.

FIG. 4 is a block diagram showing an arrangement of the smartphone 1. The smartphone 1 has the touch-screen display 2, the button 3, the illuminance sensor 4, the proximity sensor 5, a communication unit 6, the receiver 7, the microphone 8, a storage 9, a controller 10, cameras 12 and 13, an external interface 14, an acceleration sensor 15, a direction sensor 16, and a rotation detection sensor 17.

As described above, the touch-screen display 2 has the display 2A and the touch screen 2B. The display 2A displays characters, images, symbols, graphics or the like. The touch screen 2B detects a gesture.

The button 3 is operated by the user. The button 3 has the buttons 3A to 3F. The controller 10 collaborates with the button 3 to detect an operation of the button. The operation of the button is, for example, a click, a double click, a push, and a multi-push.

For example, the buttons 3A to 3C are a home button, a back button or a menu button. For example, the button 3D is a power on/off button of the smartphone 1. The button 3D may also serve as a sleep/wake-up button. For example, the buttons 3E and 3F are volume buttons.

The illuminance sensor 4 detects illuminance. For example, the illuminance is intensity, brightness, brilliance, etc. of light. For example, the illuminance sensor 4 is used for adjusting the brilliance of the display 2A.

The proximity sensor 5 detects presence of a proximate object in a contactless manner. The proximity sensor 5 detects, for example, a face being brought close to the touch-screen display 2.

The communication unit 6 performs wireless communication. Communication schemes implemented by the communication unit 6 are wireless communication schemes. For example, the wireless communication schemes include cellular phone communication schemes such as 2G, 3G and 4G. For example, the cellular phone communication schemes include LTE (Long Term Evolution), W-CDMA (Wideband Code Division Multiple Access), CDMA2000 (Code Division Multiple Access 2000), PDC (Personal Digital Cellular), GSM (Global System for Mobile Communications), PHS (Personal Handy-phone System), etc. For example, the wireless communication schemes include WiMAX (Worldwide Interoperability for Microwave Access), IEEE 802.11 (Institute of Electrical and Electronics Engineers 802.11 Specifications), Bluetooth, IrDA (Infrared Data Association), NFC (Near Field Communication), etc. Communication unit 6 may support one or more of the communication schemes described above.

When a sound signal is transmitted from the controller 10, the receiver 7 outputs the sound signal as sound. The microphone 8 converts sound such as the user's voice into a sound signal, and transmits the sound signal to the controller 10. The smartphone 1 may further have a speaker(s) in addition to the receiver 7. The smartphone 1 may further have a speaker(s) in place of the receiver 7.

The storage 9 stores programs and data. The storage 9 is also utilized as a working area for temporarily storing processing results of the controller 10. The storage 9 may include an arbitrary storage device such as a semi-conductor storage device and a magnetic storage device. The storage 9 may include several types of storage devices. The storage 9 may include a combination of a portable storage medium such as a memory card with a reader for the storage medium.

The programs stored in the storage 9 include: applications that are executed in the foreground or the background; and a control program that assists operations of the applications. For example, an application causes the display 2A to display a predetermined screen, and causes the controller 10 to execute processing in accordance with a gesture detected by the touch screen 2B. The control program is, for example, an OS (Operating System). The applications and the control program may be installed in the storage 9 via wireless communication by the communication unit 6 or via a storage medium.

The storage 9 stores, for example, a control program 9A, a mail application 9B, a browser application 9C, and setting data 9Z. The mail application 9B provides electric mail functions of creating, transmitting, receiving and displaying electric mail. The browser application 9C provides a web browsing function of displaying web pages. A table 9D stores various tables such as a key assignment table. An arrangement pattern database 9E stores patterns of arrangement such as arrangement of icons displayed on the display 2A. The setting data 9Z provides various set-up functions regarding operations of the smartphone 1.

The control program 9A provides functions regarding a variety of control for operating the smartphone 1. For example, the control program 9A implements a telephone call function by controlling the communication unit 6, the receiver 7, the microphone 8, etc. The functions provided by the control program 9A include functions of executing a variety of control such as changing the information displayed on the display 2A in accordance with a gesture detected via the touch screen 2B. The functions provided by the control program 9A may be utilized in combination with functions provided by other programs such as the mail application 9B.

The controller 10 is, for example, a CPU (Central Processing Unit). The controller 10 may be an integrated circuit such as an SoC (System-on-a-chip) that integrates other constituent elements such as the communication unit 6. The controller 10 comprehensively controls the operations of the smartphone 1 to implement various functions.

More specifically, the controller 10 implements various functions by referring to data stored in the storage 9 as necessary, executing instructions included in a program stored in the storage 9, and controlling the display 2A, the communication unit 6, etc. The controller 10 may change the control in accordance with a result of detection by various detecting units such as the touch screen 2B, the button 3 and the acceleration sensor 15.

For example, the controller 10 executes the control program 9A to execute a variety of control such as changing the information displayed on the display 2A in accordance with a gesture detected via the touch screen 2B.

The camera 12 is an in-camera that photographs an object from a side of the front face 1A. The camera 13 is an out-camera that photographs an object from a side of the back face 1B.

The external interface 14 is a terminal to which another device is connected. The external interface 14 may be a universal terminal such as USB (Universal Serial Bus), HDMI (High-Definition Multimedia Interface), Light Peak (Thunderbolt), and an earpiece-microphone connector. The external interface 14 may be a terminal designed for exclusive use, such as a Dock connector. A device that is connected to the external interface 14 includes, for example, an external storage, a speaker, and a communication device.

The acceleration sensor 15 detects a direction and a level of acceleration that acts on the smartphone 1. The direction sensor 16 detects an orientation of geomagnetism. The rotation detection sensor 17 detects rotation of the smartphone 1. Results of such detection by the acceleration sensor 15, the direction sensor 16 and the rotation detection sensor 17 are utilized in combination to detect change in the position and posture of the smartphone 1.

The smartphone 1 thus constituted can reduce power consumption. Descriptions are hereinafter provided for a specific configuration.

Figure 5:
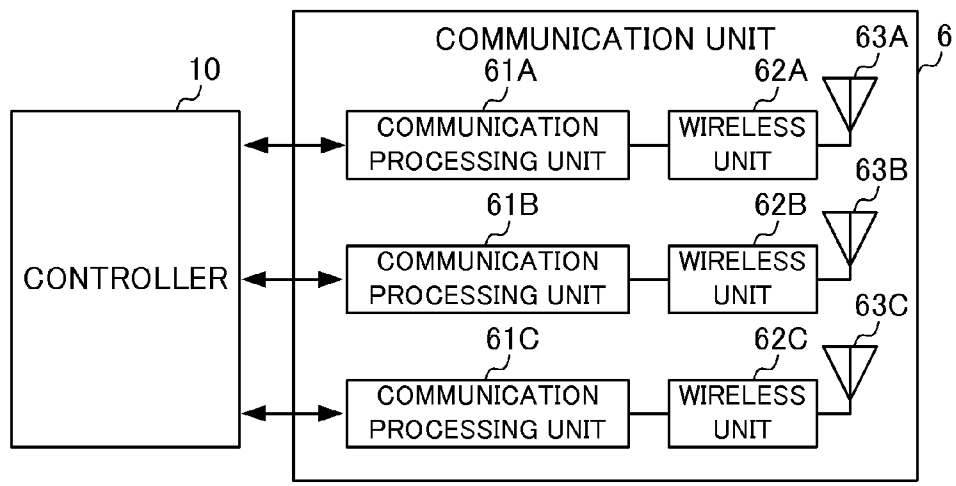
FIG. 5 is a block diagram showing detailed functions of a communication unit and a controller according to the embodiment.

FIG. 5 is a block diagram showing detailed functions of the communication unit 6 and the controller 10 (control unit) in the smartphone 1.

The smartphone 1 supports wireless communication systems of WiFi defined in IEEE 802.11, WiMAX defined in IEEE 802.16e, and 3G schemes (for example, CDMA2000_1×EVDO, W-CDMA, etc. hereinafter referred to as a "3G system") as wireless communication systems for performing data communication.

The communication unit 6 includes: a communication processing unit 61A (a second communication unit), a wireless unit 62A and an antenna 63A, all of which support WiFi; a communication processing unit 61B (a first communication unit), a wireless unit 62B and an antenna 63B, all of which support WiMAX; and a communication processing unit 61C, a wireless unit 62C and an antenna 63C, all of which support the 3G system.

The communication processing units 61 (A, B and C) control the wireless units 62 (A, B and C), respectively, and perform state transition such as connection and disconnection to and from corresponding wireless communication systems.

The wireless units 62 (A, B and C) execute demodulation processing on signals received from the antennas 63 (A, B and C), respectively, supply the signals thus processed to the communication processing units 61, execute modulation processing on signals supplied from the communication processing units 61, and transmit the signals thus processed from the antennas 63 to external devices.

The communication processing unit 61A communicates with an external device (for example, a personal computer), and relays the external device to a network of WiMAX or 3G systems via tethering.

Here, in a case in which the smartphone 1 is used in a tethering mode by connecting the communication processing unit 61A with the external device, a request for data communication may occur in the external device, even while the power supply of the touch-screen display 2 is turned off.

However, even in the tethering mode, in a case in which communication with the external device is disconnected, data communication does not newly occur. Therefore, if WiMAX is continuously searched for, there has been a possibility for the power to be uselessly consumed.

The controller 10 executes predetermined control of the communication processing units 61 (A, B and C), and instructs state transition for saving the electric power.

More specifically, in a case of tethering by connecting the communication processing unit 61A with the external device, in a state where the communication processing unit 61B is searching for WiMAX, when the power supply of the touch-screen display 2 is turned off, in a case in which communication with the external device via the communication processing unit 61A is not disconnected, the controller 10 causes the communication processing unit 61B to continue searching for WiMAX.

On the other hand, in a case in which communication with the external device via the communication processing unit 61A is disconnected, the controller 10 causes the communication processing unit 61B to stop searching for WiMAX.

After the controller 10 has caused the communication processing unit 61B to stop searching for WiMAX, when the power supply of the touch-screen display 2 is turned on, the controller 10 causes the communication processing unit 61B to start searching for WiMAX, in preparation for occurrence of data communication by WiMAX that is given priority over the 3G system.

After the controller 10 has caused the communication processing unit 61B to stop searching for WiMAX, when communication with the external device via the communication processing unit 61A is started, the controller 10 causes the communication processing unit 61B to start searching for WiMAX.

Figure 6:
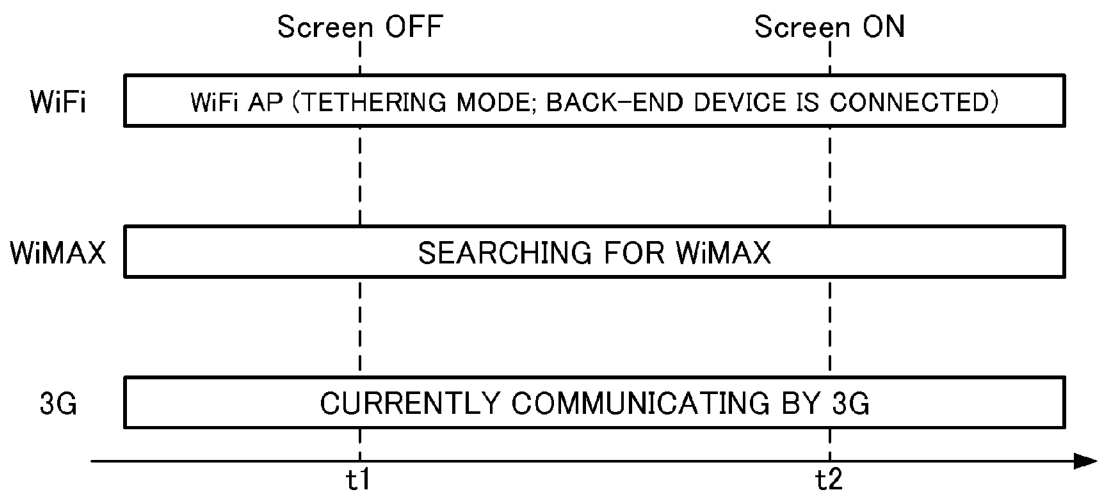
FIG. 6 is a diagram showing a first pattern of state transition according to the embodiment in time series.

FIG. 6 is a diagram showing a first pattern of state transition of the communication processing units 61 (A, B and C) in time series.

The communication processing unit 61A functions as an access point (AP) of the external device in the tethering mode, in which the communication processing unit 61A is actually connected to the external device that is a back-end device.

Here, a session of data communication in WiMAX has been disconnected, and the communication processing unit 61B is searching for WiMAX. The communication processing unit 61C is performing data communication by being connected to the 3G system.

At time t1, when the power supply of the touch-screen display 2 is turned off, the controller 10 determines that WiMAX is currently utilized via tethering, and that the back-end device is actually connected to the smartphone 1; and the controller 10 causes the communication processing unit 61B to continue searching for WiMAX.

Even after the power supply of touch-screen display 2 is turned on at time t2, the communication processing units 61 (A, B and C) maintain each state.

Figure 7:
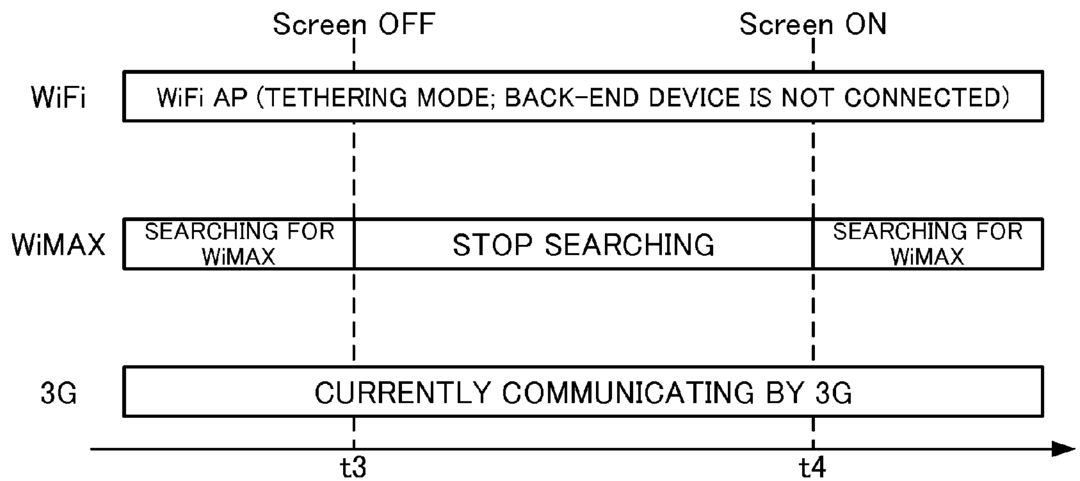
FIG. 7 is a diagram showing a second pattern of state transition according to the embodiment in time series.

FIG. 7 is a diagram showing a second pattern of state transition of the communication processing units 61 (A, B and C) in time series.

The communication processing unit 61A functions as the access point of the external device in the tethering mode, but is not actually connected to the back-end device.

Before time t3, a session of data communication in WiMAX has been disconnected, and the communication processing unit 61B is searching for WiMAX. The communication processing unit 61C is performing data communication by being connected to the 3G system.

At time t3, when the power supply of the touch-screen display 2 is turned off, the controller 10 determines that WiMAX is currently utilized via tethering, and that the back-end device is not actually connected to the smartphone 1; and the controller 10 causes the communication processing unit 61B to stop searching for WiMAX.

At time t4, when the power supply of the touch-screen display 2 is turned on, the communication processing unit 61B starts searching for WiMAX that is given priority over the 3G system; and when a WiMAX system is successfully captured, the WiMAX as a middle-level bearer takes over the data communication from the 3G system as a low-level bearer.

Figure 8:
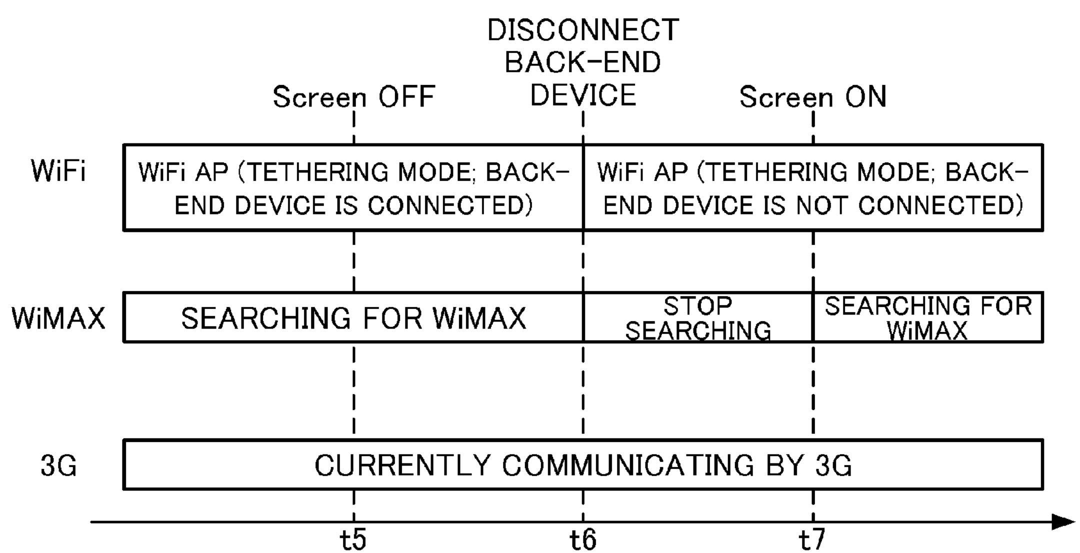
FIG. 8 is a diagram showing a third pattern of state transition according to the embodiment in time series.

FIG. 8 is a diagram showing a third pattern of state transition of the communication processing units 61 (A, B and C) in time series. The communication processing unit 61A functions as the access point of the external device (the back-end device) in the tethering mode, in which the communication processing unit 61A is actually connected to the back-end device.

Here, a session of data communication in WiMAX has been disconnected, and the communication processing unit 61B is searching for WiMAX. The communication processing unit 61C is performing data communication by being connected to the 3G system.

At time t5, when the power supply of the touch-screen display 2 is turned off, the controller 10 determines that WiMAX is being utilized via tethering, and that the back-end device is actually connected to the smartphone 1; and the controller 10 causes the communication processing unit 61B to continue searching for WiMAX.

At time t6, when the connection to the back-end device is disconnected, the controller 10 determines that WiMAX is currently utilized via tethering, and that the back-end device is not actually connected to the smartphone 1; and the controller 10 causes the communication processing unit 61B to stop searching for WiMAX.

At time t7, when the power supply of the touch-screen display 2 is turned on, the communication processing unit 61B starts searching for WiMAX that is given priority over the 3G system; and when a WiMAX system is successfully captured, the WiMAX as a middle-level bearer takes over the data communication from the 3G system as a low-level bearer.

Figure 9:
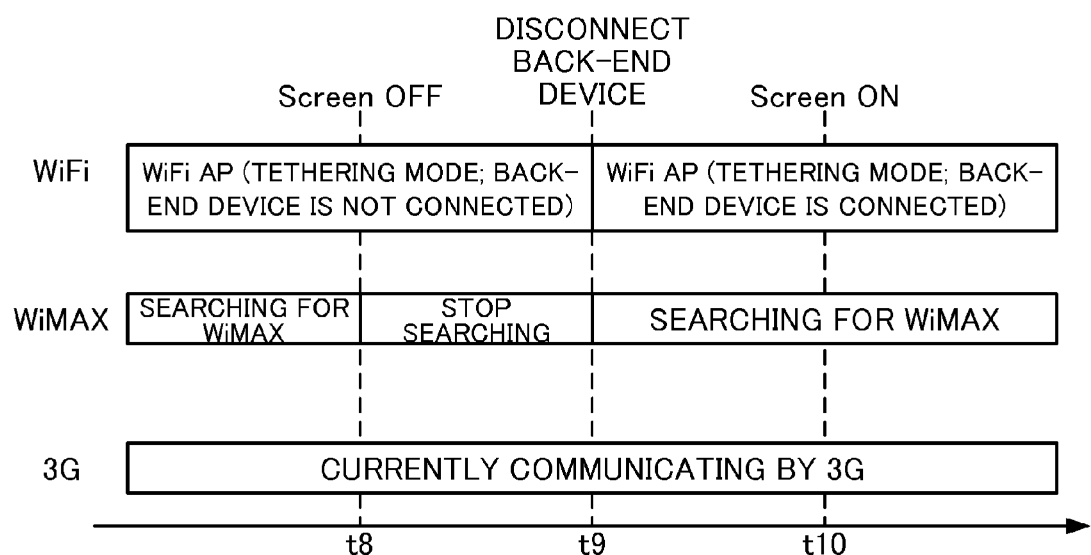
FIG. 9 is a diagram showing a fourth pattern of state transition according to the embodiment in time series.

FIG. 9 is a diagram showing a fourth pattern of state transition of the communication processing units 61 (A, B and C) in time series.

The communication processing unit 61A functions as the access point of the external device in the tethering mode, but is not actually connected to the back-end device.

Before time t8, a session of data communication in WiMAX has been disconnected, and the communication processing unit 61B is searching for WiMAX. The communication processing unit 61C is performing data communication by being connected to the 3G system.

At time t8, when the power supply of the touch-screen display 2 is turned off, the controller 10 determines that WiMAX is currently utilized via tethering, and that the back-end device is not actually connected to the smartphone 1; and the controller 10 causes the communication processing unit 61B to stop searching for WiMAX.

At time t9, when the back-end device is connected, the controller 10 determines that WiMAX is currently utilized via tethering, and that the back-end device is actually connected to the smartphone 1; and the controller 10 causes the communication processing unit 61B to start searching for WiMAX.

At time t10, even after the power supply of touch-screen display 2 is turned on, the communication processing units 61 (A, B and C) maintain each state.

Figure 10:
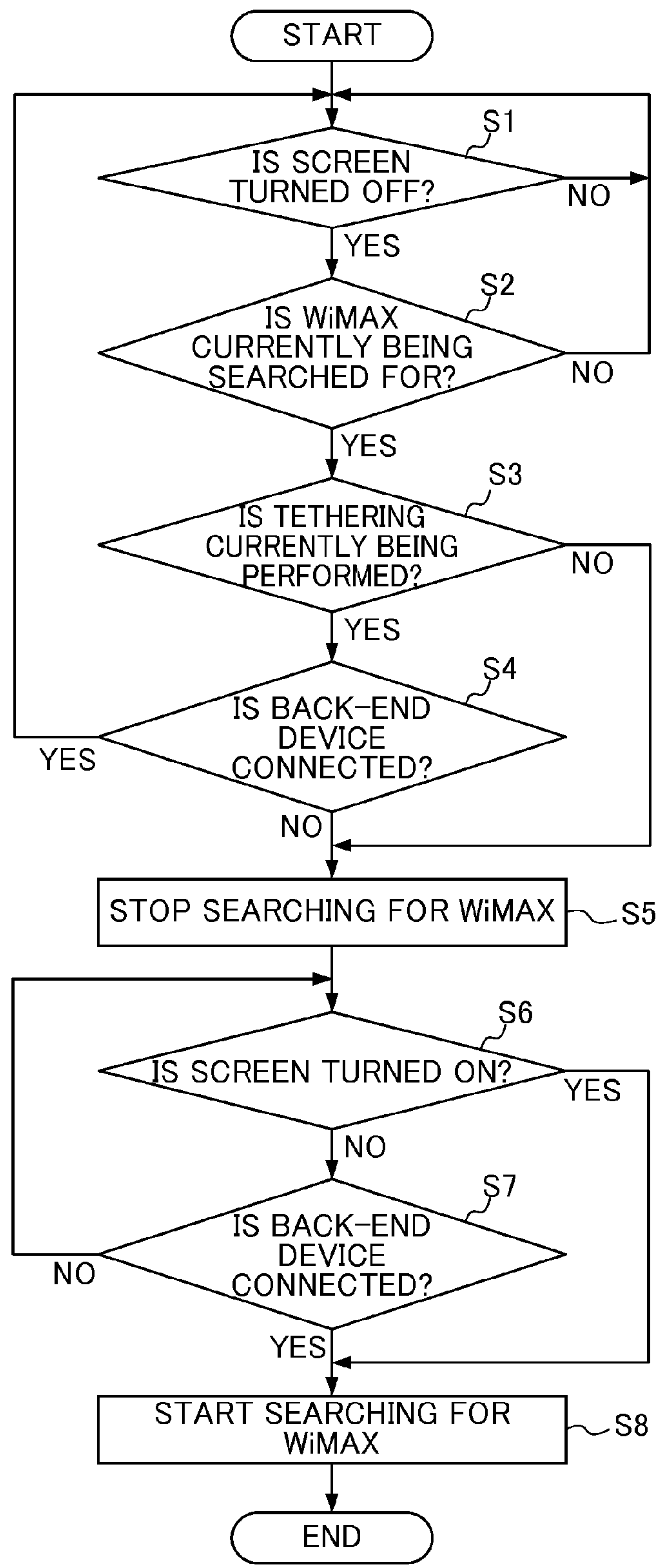
FIG. 10 is a flow chart showing processing by a controller according to the embodiment.

FIG. 10 is a flowchart showing processing by the controller 10 regarding state transition of the communication processing unit 61B of the smartphone 1.

In Step S1, the controller 10 determines whether the power supply of the touch-screen display 2 is turned off. In a case in which the determination is YES, the processing advances to Step S2, and in a case in which the determination is NO, the processing returns to Step S1.

In Step S2, the controller 10 determines whether the communication processing unit 61B has lost WiMAX and is now searching for WiMAX. In a case in which the determination is YES, the processing advances to Step S3, and in a case in which the determination is NO, the processing returns to Step S1.

In Step S3, the controller 10 determines whether the communication processing unit 61A is communicating with the back-end device in the tethering mode for relaying the back-end device to the network of the WiMAX or 3G system. In a case in which the determination is YES, the processing advances to Step S4, and in a case in which the determination is NO, the processing advances to Step S5.

In Step S4, the controller 10 determines whether the back-end device is actually connected. In a case in which the determination is YES, the processing returns to Step S1 in preparation for occurrence of a communication request, and in a case in which the determination is NO, the processing advances to Step S5.

In Step S5, the controller 10 causes the communication processing unit 61B to stop searching for WiMAX.

In Step S6, the controller 10 determines whether the power supply of the touch-screen display 2 is turned on again. In a case in which the determination is YES, the processing advances to Step S8, and in a case in which the determination is NO, the processing advances to Step S7.

In Step S7, the controller 10 determines whether the back-end device is actually connected. In a case in which the determination is YES, the processing advances to Step S8, and in a case in which the determination is NO, the processing returns to Step S6.

In Step S8, the controller 10 causes the communication processing unit 61B to start searching for WiMAX, in preparation for occurrence of new communication.

As described above, according to the present embodiment, in a state of searching for WiMAX in the tethering mode for connecting the back-end device via WiFi, when the power supply of the touch-screen display 2 is turned off, the smartphone 1 determines whether the back-end device is actually connected. In a case in which the communication with the back-end device is disconnected, the smartphone 1 causes the communication processing unit 61B to stop searching for WiMAX; and in a case in which the communication with the back-end device is not disconnected, the smartphone 1 causes the communication processing unit 61B to continue searching for WiMAX.

Therefore, even while the tethering is being performed, in a state where the back-end device is not actually connected and therefore communication does not occur, the smartphone 1 can reduce the power that would be uselessly consumed if the searching is continued.

Since data communication can be continued via a 3G system even if the searching for WiMAX is stopped, the smartphone 1 can reduce the power consumption while suppressing deterioration of the convenience.

After the smartphone 1 has stopped searching for WiMAX, when the power supply of the touch-screen display 2 is turned on, the smartphone 1 starts searching for WiMAX; therefore, it is possible to quickly respond to a new communication request.

After the smartphone 1 has stopped searching for WiMAX, even if the power supply of the touch-screen display 2 is turned off, the smartphone 1 starts searching for WiMAX upon starting communication with the back-end device; therefore, it is possible to respond to a new communication request.

An embodiment of the present invention has been described above, but the present invention is not limited to the embodiment described above. The effects described above in the embodiment of the present invention are merely results describing the most preferable effects that arise from the present invention, and the effects that arise from the present invention are not limited to the effects described in the above embodiment.

The arrangement of the smartphone 1 shown in FIG. 4 and FIG. 5 is merely an example and may be modified as appropriate within a scope that does not depart from the spirit of the present invention.

For example, the display unit has been described as the touch-screen display 2 that has the function of detection via the touch screen 2B, but the display unit may be a display device without a function of detection.

The communication processing units 61 have been described as units that support WiFi, WiMAX and the 3G system, but the present invention is not limited thereto. The wireless systems may be other wireless communication systems, and the communication processing units 61 may support four or more wireless communication systems.

The second communication unit (for example, the communication processing unit 61A) that is used for tethering may use protocols such as Bluetooth, IrDA and USB.

A part or all of the programs stored in the storage 9 as described in FIG. 4 may be downloaded from other devices via wireless communication by the communication unit 6. A part or all of the programs stored in the storage 9 as described in FIG. 4 may be stored in a storage medium that is readable by a reader included in the storage 9. A part or all of the programs stored in the storage 9 as described in FIG. 4 may be stored in a storage medium such as a CD, a DVD or a Blu-ray that is readable by a reader connected to the external interface 14.

Each of the programs shown in FIG. 4 may be divided into a plurality of modules, and may be combined with other programs.

In the above embodiment, a smartphone has been described as an example of the wireless terminal device, but the wireless terminal device is not limited to a smartphone. For example, the wireless terminal device may be a portable electronic device such as a mobile phone, a portable personal computer, a digital camera, a media player, a digital book reader, a navigator or a gaming machine, or may be a module dedicated for communication, which is specialized for a communication function. The wireless terminal devices may be a non-portable electronic device such as a desktop PC or a television set.

What is claimed is:

1. A wireless terminal device comprising:

a first communication unit that performs wireless communication by a network of a first wireless communication system;

a second communication unit that performs communication with an external device;

a display unit; and a control unit; wherein, the control unit causes the first communication unit to search for the first wireless communication system on condition that the power supply of the display unit is on or that communication with the external device by the second communication unit is connected, and the control unit causes the first communication unit to stop searching for the first wireless communication system on condition that a power supply of the display unit is off and that communication with the external device by the second communication unit is disconnected.

2. The wireless terminal device according to claim 1, wherein, in a state of searching for the first wireless communication system, in a case in which the power supply of the display unit is turned off and communication with the external device by the second communication unit is not disconnected, the control unit causes the first communication unit to continue searching for the first wireless communication system.

3. The wireless terminal device according to claim 1, wherein, after the control unit causes the first communication unit to stop searching for the first wireless communication system, when the power supply of the display unit is turned on, the control unit causes the first communication unit to start searching for the first wireless communication system.

4. The wireless terminal device according to claim 1, wherein, after the control unit causes the first communication unit to stop searching for the first wireless communication system, when communication with the external device by the second communication unit is connected, the control unit causes the first communication unit to start searching for the first wireless communication system.

5. The wireless terminal device according to claim 1, wherein the first communication unit uses a communication scheme conforming to IEEE802.16e.

6. The wireless terminal device according to claim 1, wherein the second communication unit uses a communication scheme conforming to IEEE802.11.

7. A communication control method for a wireless terminal device including: a first communication unit that performs wireless communication by a network of a first wireless communication system; a second communication unit that performs communication with an external device; a display unit; and a control unit; wherein the control unit causes the first communication unit to search for the first wireless communication system on condition that the power supply of the display unit is on or that communication with the external device by the second communication unit is connected, and the control unit causes the first communication unit to stop searching for the first wireless communication system on condition that a power supply of the display unit is off and that communication with the external device by the second communication unit is disconnected.

8. The communication control method according to claim 7, wherein, in a state of searching for the first wireless communication system, in a case in which the power supply of the display unit is turned off and communication with the external device by the second communication unit is not disconnected, the method causes the first communication unit to continue searching for the first wireless communication system.

9. A non-transitory storage medium storing a program for controlling communication of a wireless terminal device including: a first communication unit that performs wireless communication by a network of a first wireless communication system; a second communication unit that performs communication with an external device; a display unit; and a control unit, wherein, the control unit causes the first communication unit to search for the first wireless communication system on condition that the power supply of the display unit is on or that communication with the external device by the second communication unit is connected, and the control unit causes the first communication unit to stop searching for the first wireless communication system on condition that a power supply of the display unit is off and that communication with the external device by the second communication unit is disconnected.

* * * * *